June 11, 1968

R. BOWERS ET AL 3,388,321

MAGNETO-PLASMA WAVE DEVICE

Filed May 28, 1964

INVENTORS
RAYMOND BOWERS
JAMES R. HOUCK

BY

INVENTORS
RAYMOND BOWERS
JAMES R. HOUCK
BY

United States Patent Office 3,388,321
Patented June 11, 1968

3,388,321
MAGNETO-PLASMA WAVE DEVICE
Raymond Bowers and James R. Houck, Ithaca, N.Y., assignors to the United States of America as represented by the United States Atomic Energy Commission
Filed May 28, 1964, Ser. No. 371,164
3 Claims. (Cl. 324—.5)

ABSTRACT OF THE DISCLOSURE

Method and apparatus for measuring the strength and polarity of a magnetic field by providing an alternating current signal whose frequency is proportional to the strength of a magnetic field and in which a solid is inserted at low temperature to produce self oscillating magneto-plasma waves corresponding to the strength of the field.

---

This invention relates to magnetic measuring devices and more particularly to devices for measuring and controlling high strength magnetic fields.

In the field of physics, it is often desirable to measure the strength of strong magnetic fields. Various proposals have been made and used to accomplish such measurements, including arrangements employing measurements of nuclear resonance, magneto resistance, Hall voltage, and voltage developed in moving coils. While these arrangements are useful and can accomplish the desired measurement they do require the manufacture and assembly of complicated, delicate or movable means or require the measurement of small voltages (often D.C.) where reliability or accuracy has been difficult or impossible. Furthermore, these devices have generally been limited to room temperature measurements or have required high input powers to operate at low temperatures.

It has now been discovered that magnetic fields can be measured simply and accurately with low power by using low frequency plasma resonance waves, and in accordance with this invention, there is provided a method and apparatus for the measurement of high strength fields in a space at low temperature in the range above about 3 kg. (kilogauss), such as the fields provided by superconductors for magneto hydrodynamic converters, high energy accelerators, or fusion devices. The method and construction involved in this invention utilize standard and well known techniques and apparatus and are highly flexible for a wide range of applications and magnetic field strengths. More particularly, this invention involves the use of an alternating current having a first coil to produce plasma resonance waves in a solid, and in one embodiment, this excitation produces a resonance oscillation frequency in a second pickup coil wound on the solid for translation into information relative to the value of the magnetic field being measured. With the proper selection of components, as described in more detail hereinafter, the required field strength measurement can be obtained simply and accurately at low frequencies, i.e. in the audio range. Moreover, by suitably amplifying the output from the pickup coil and feeding it into the drive coil producing the plasma waves in the solid, a low power, self-oscillatory system is provided having an oscillation frequency determined by and linearly corresponding with the strength of the magnetic field from low to very high field strengths.

It is an object of this invention, therefore, to provide an improved magnetic measuring method and apparatus;

It is another object of this invention to measure high strength magnetic fields at low temperatures;

It is another object of this invention to provide a method and apparatus having frequency sensitive means for measuring magnetic field strength;

It is another object of this invention to provide a small, low frequency, plasma wave oscillator for accurately measuring high strength magnetic fields at low temperatures;

It is also an object of this invention to provide a magneto-plasma wave oscillator;

It is a further object of this invention to provide a plasma wave oscillator having an inherent or self-directing oscillation frequency that is determined by and corresponds with the strength of the magnetic field;

It is still a further object of this invention to provide means for measuring and controlling the magnetic fields generated by superconductor fields for magneto hydrodynamic converters, accelerators, stellarators and the like.

Various other objects and advantages will appear from the following description of two embodiments of the invention, and the novel features will be particularly pointed out hereinafter in connection with the appended claims.

In the figures where like parts are marked alike:

It is known that certain superconductors generate high magnetic fields as described in Phys. Rev. Letters 6, 89, 671, 452 and 8, 275, and this had led to the need and use of superconductor solenoids for devices such as magnet-hydrodynamic converters, high energy accelerators and fusion devices, such as the stellarators at Princeton University. One superconductor stellarator is described in U.S. Patent No. 3,177,408 issued Apr. 6, 1965, assigned to the assignee of this invention. That application illustrates a superconductor solenoid in which the resistance of the superconductor is zero if the superconductor is held at a low temperature in a cryostat. In contrast, the resistance of a normal solenoid made of non-superconducting wire is not zero even though exposed to the same low temperature.

Figure 1:
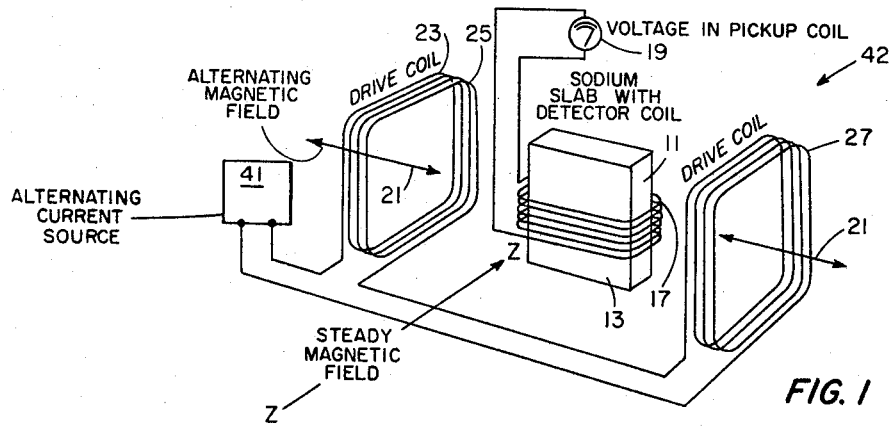
FIG. 1 is a partial isometric view of a solid for generating magneto-plasma waves.

In order to understand how the method and apparatus of this invention measure high strength magnetic fields at low temperatures, reference is made to FIG. 1 wherein is illustrated a steady magnetic field along an axis $z$—$z$, representing the path and direction of the magnetic field lines whose strength is to be measured. Disposed along the $z$—$z$ axis is a small, rectangular solid slab 11 located with parallel faces 13 perpendicular to the $z$—$z$ axis. These faces of the slab 11 carry a detector coil 17 having parallel windings wound around the slab 11. The axis of the detector coil is perpendicular to $z$—$z$ and perpendicular to the axis of the drive coils 23. The detector coil is connected to an oscilloscope or A.C. voltmeter 19.

It will be understood that in certain conductors, for example, high conductivity metals such as sodium, the electrons are extremely mobile and at low temperatures below about 21° K., the electrons experience small friction. At the temperature of liquid helium, for example, the conductivity can be 7000 times greater than it is at room temperature and the Lorentz force compared with the friction force is very large. The theory of these forces as applied to plasma waves are described in the article by R. Bowers, the co-inventor of this invention, on pp. 46 et seq. of the November 1963, vol. 209, No. 5, Scientific American.

An alternating magnetic field applied to a cold slab 11 normally to the $z$—$z$ axis and perpendicular to the axis of coils 17 by a drive coil 23 having parallel coils whose axis is at right angles to the axis of the detector coil 17, produces magneto-plasma resonance waves in slab 11.

For example, considering the direction 21 of an alternating magnetic field generated by a few ma. alternating signal in drive coil 23 arranged in two series sections 25 and 27 on opposite sides of slab 11 in planes normal to the plane of the detector coil 17, an easily detectable plasma resonance wave is produced in the slab 11 much like the standing wave shape that is produced when a violin string is bowed. The detector 19 shows a voltage peak at certain particular frequencies when the frequency of the signal in drive coil 23 is varied, and the frequency of this peak corresponds to the strength of the field to be measured along the z—z axis.

The frequency of this magneto-plasma resonance wave depends on the density of the carriers in slab 11. Also, the half-wave lengths or multiples of the half wave lengths will fit exactly into the box provided by the slab 11. Thus the frequency of this wave, which is a resonant dynamic response, can be calculated from the parameters of density of the carriers in the solid 11 and depends on the linear dimensions of the sample.

A practical arrangement for accomplishing the measurement of magnetic fields along the z—z axis from 3 kg. to over 200 kg., comprises a slab 11 that is 1 cm. square and 1 mm. thick. At 4° K. in a 30 kg. field along the z—z axis a sodium slab of these dimensions has a resonant frequency of about 260 c.p.s. and a Q around 30. Aluminum and indium slabs 11 of like dimensions, however, may also be used to measure the fields. To this end they produce audio-frequency plasma waves i.e., of the order of up to 1000 c.p.s., or an order of magnitude higher or lower, with Q's higher than 10 at fields up to 90 kg. In contrast, even at low fields PbTe gives a radio-frequency plasma wave with ~ a 1 megacycle resonance and a Q of below 10 and InSb gives a plasma wave resonance in the microwave range of ~10 kmc. and require complicated, high power, alternating current sources.

With several hundred turns on the pickup and drive coils 17 and 23 respectively pickup coil voltages of 10–50 milli-volts are easy to achieve with slabs (11) having dimensions of 1 x 1 x .2 cm. even without amplification. However, smaller slabs 11 and more turns on the drive coils also produce like pickup voltages. Advantageously, the drive coil 23 is supplied with the several ma. signal from a conventional audio-frequency oscillator 41 and with such a signal the frequency of the peak in the output voltage is measured by an oscilloscope or A.C. voltmeter 19.

Figure 2:
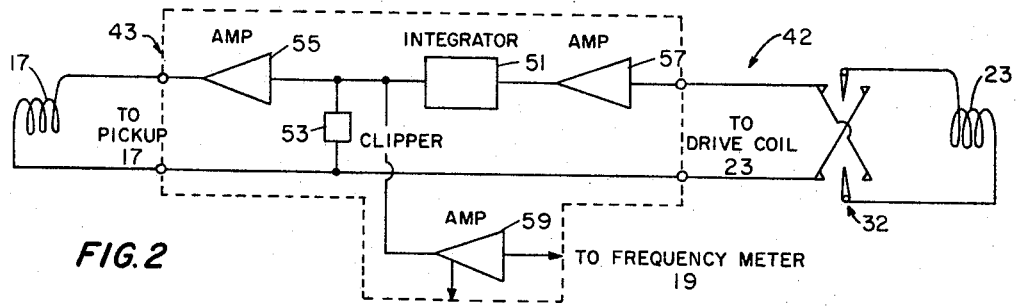
FIG. 2 is a schematic circuit drawing of a feed-back system for the solid of FIG. 1.

Should the output of the pickup coil 17 be fed directly into the drive coil 23, e.g. as illustrated in FIG. 2, the system of this invention is self oscillatory and provides a plasma wave resonance oscillator 42 having an oscillation frequency completely determined by and corresponding with the magnetic field along the z—z axis. Moreover, with an amplifier for this direct feedback system, the oscillation frequency varies linearly with field strength along the z—z axis from high to low fields. To this end this feedback amplifier advantageously has a 90° phase shift between input and output at all relevant frequencies, i.e. between 100 and 2000 c.p.s.; internal limiting to control the level of oscillation, and an open loop gain greater than one at all fields larger than 3 kg. along the axis z—z to be tested.

Referring to FIG. 2, the 90° phase shift for this feedback amplifier is easily accomplished in amplifier 43 by integrating the signal in integrator 51. This also helps maintain the open loop gain. The internal limiting is accomplished by diode clipping of the signal in a suitable clipper 53. To this end the signal from the pickup coil 17 is first amplified in amplifier 55 and then clipped in clipper 53. The square wave is then integrated in integrator 51, amplified in amplifier 57 and fed into the drive coil 23. It has been found preferable to clip the wave form before integration for two reasons. First, the wave shape fed into the drive coil 23 has a smaller high frequency component thus reducing both direct pickup and harmonic excitation of the plasma wave in slab 11 by the drive coils 23. Second, the signal feed into the drive coil decreases linearly with frequency while the pickup increases linearly with frequency. Therefore, no element in the circuit must stand the full quadratic dependance of the feedback. The signal from pickup 17 may also pass advantageously through amplifier 59 before entering frequency meter 19.

Figure 3:
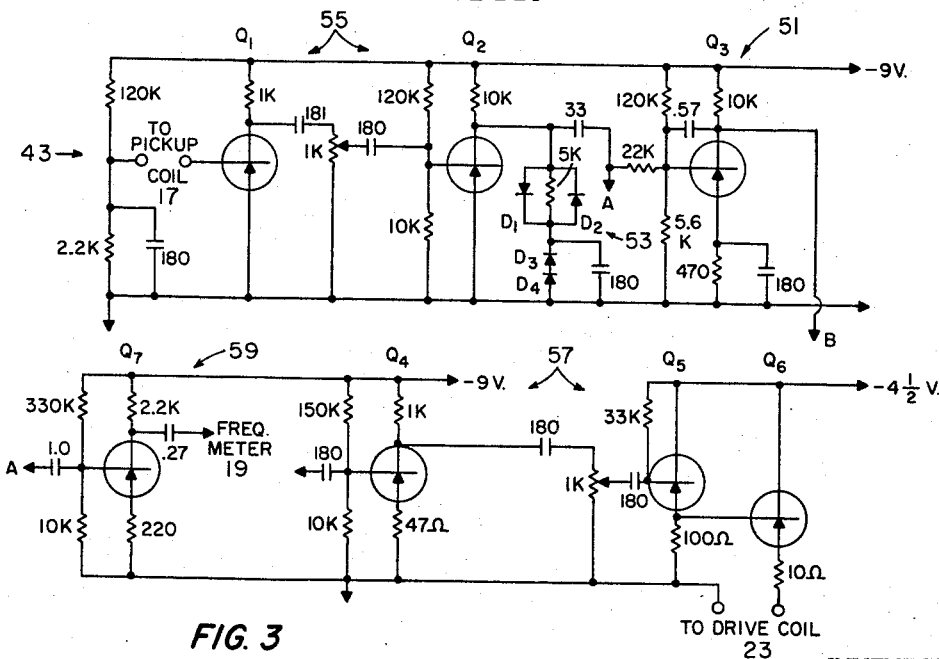
FIG. 3 is a detailed circuit drawing of elements of FIG. 2.

To obtain the desired feed-back in accordance with one embodiment of amplifier 43, reference is made to FIG. 3. Amplifier means 55 comprises transistors $Q_1$ and $Q_2$ to amplify the signal with a combined gain of ~750. Diodes $D_1$ and $D_2$ then clip the signal in clipper 53 to form a square wave approximately .3 volt peak to peak. $Q_3$ serves as an integrator 51 having a time constant of about 1½ seconds. $Q_4$ has a voltage gain of 20 and $Q_5$ and $Q_6$ amplify the integrated signal in amplifier 57 with a current gain greater than 100. The latter combination of $Q_5$ and $Q_6$ corresponds to a conventional Darlington amplifier. $Q_7$ comprises amplifier 59 which amplifies the square wave output of the clipper 53 for the external frequency meter 19. The individual components comprise:

Q ---------------------------------------- 2N1309
$D_1=D_2$ ---------------------------------- 1N34A
$D_3=D_4$ ---------------------------------- 1N485

(Capacitors in μf.)

In theory the described oscillator system 42 has an inherent linearity of better than .05%. With the circuit 42 shown, a linearity of better than .5% has actually been attained from 10 to 80 kg. and the linearity increases to only about 1% from 5 kg. to 3 kg. or less. The latter is limited by the low frequency limit of amplifier 43 but this can be improved since it is determined by lack of gain to maintain oscillation; phase shifts in the R.C. networks between the transistor which can be avoided in a direct coupled circuit; and inherent nonlinearity of resonant frequency in the low Q limit (i.e. small H). Moreover, the linearity of the existing circuit can be improved by a factor 5× by a reduction in the phase shifts in amplifiers 55 and 57. In this regard the transistors used have β roll off at 100 kc. and at several kc. the phase shift in the circuit (6 transistors) is not really 90°. One, therefore, can improve the linearity by substituting high frequency transistors for the described transistors. Also, the magneto-plasma resonance waves have been varied over a wide range of frequencies, have been produced essentially independent of temperature at low temperature and have been operable in accurately determining the strength of high uniform and high non-uniform magnetic fields above 3 kg.

If the direction of the magnetic field along z—z is reversed the phase of the pickup signal is changed by 180°. Therefore, for the system to be oscillatory upon changing the field direction one must reverse the leads between the pickup coil or drive coil and the amplifier. This is accomplished by a switch 32. The direction of the field can be determined by noting the switch position required for oscillation. In addition to this above determination of the polarity of the magnetic field, one can adjust the orientation of the probe for maximum frequency of oscillation. The direction of the magnetic field is then perpendicular to the specimen slab.

Actual values have been obtained for magnetic field strengths vs. oscillation frequencies for the described feedback system of this invention. These are 0.1 kc./s. at 9 kg. and 1.1 kc./s. at 107 kg. with a linear variation in between.

Figure 4:
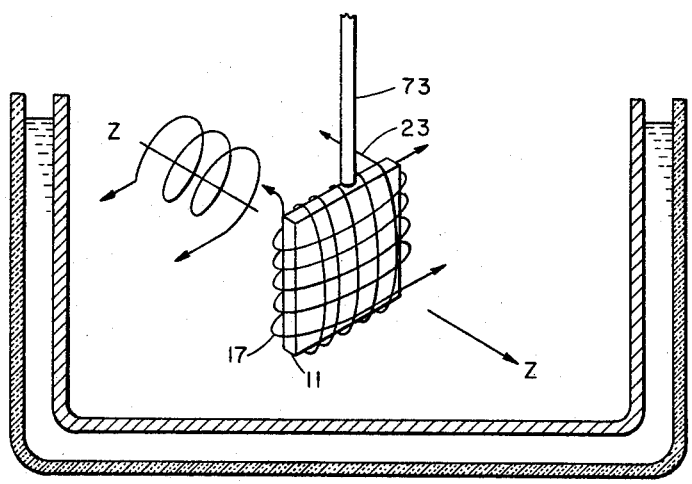
FIG. 4 is a partial cross-section of another embodiment of the detector of FIG. 1 in a cryostat.

Referring to FIG. 4, in another embodiment for the drive and pickup coils, drive coil 23 is a single coil enveloping the entire specimen 11 of FIG. 6. In the presence of a magnetic field produced by superconductor solenoid 72 along the z—z axis in cryostat C, transient noise drives coil 23 to produce plasma waves in slab 11 and these are detected by meter 19. Advantageously to this end the slab 11, coil 17, coil 23 and the leads for the coils are all carried in an extended insulator holder 73 whereby the detector of this invention is readily and easily portable even in a very confined space such as provided by a small diameter superconductor solenoid 72 which generates the field to be measured. In this embodiment, the amplifier 43 of FIG. 3 is connected to detector coil 17 on one side and is connected to drive coil 23 and meter 19 on the other side as shown in FIG. 2. Also, the detector coil 17 is interposed between the drive coil 23 and slab 11, the detector coil 17 is wrapped in parallel coils around slab 11 normally to the z—z axis and drive coil 23 has parallel coils normal to the axis of detector coil 17 which generate field lines perpendicular to the z—z axis.

It is understood from the above that this invention is also useful in controlling the magnetic field and to this end the pick-up frequency is converted to a D.C. voltage which is applied to a standard feed-back network.

The above described detector provides magnetic field strength measurements at low temperatures and by the operation of low frequency plasma wave oscillation provides great simplicity and accuracy over a wide range of magnetic field strengths above 3 kg. as required in stellarators and the like. Actual fields of 100 kg., for example, have been measured linearly with plasma frequency with the system of this invention.

As the foregoing relates to several embodiments of this invention and numerous modifications and alterations thereof may be made therein without departing from the spirit and scope of the invention, it is intended that the appended claims define the scope of this invention.

What is claimed is:

1. Apparatus for measuring a high strength unidirectional magnetic field generated by a conductor at low temperatures, comprising a small plasma wave conducting slab of sodium having parallel first faces and parallel second faces normal to said first faces, an insulated holder for positioning said slab in said unidirectional field with said first faces at right angles to said field, a drive coil enveloping said slab in first windings in parallel planes normal to said first and second faces, a detector coil interposed between said drive coil and said slab and wrapped around said first and second faces in parallel planes normal to the axis of said drive coil, amplifier-integrator circuit means connecting said detector coils to said drive coils, frequency detecting means for detecting the frequency or oscillations at the output of said integrator means, clipping means connected in said amplifier-integrator circuit, said amplifier-integrator circuit means connecting said detector and drive coils in a closed loop whereby plasma wave oscillations produced in said slab when immersed in said magnetic field are self-oscillatory at a frequency that linearly corresponds with the strength of said magnetic field from low to high fields for determining the strength of said field with said frequency detecting means, and means for reversing the connections in said loop at said drive coil for determining the polarity of said magnetic field by selectively providing plasma wave oscillations in said slab in a magnetic field of only one polarity.

2. The invention of claim 1 in which said sodium is a 1 mm. thick slab at 4° K. for providing a low resonant frequency and a high Q in a high magnetic field of 30 kg.

3. The method of measuring the strength of a constant, unidirectional, high strength magnetic field generated by a superconductor at low temperature, comprising placing a small slab of sodium in said field, exciting said slab with an audio frequency signal in a driving coil to produce a plasma-wave resonance in said slab, picking up a plasma-wave resonance signal, amplifying said picked up resonance signal, shifting the phase of the amplified resonance signal 90°, feeding said phase shifted resonance signal back to said driving coil through an internal limiting means to control the level of oscillation, and determining the peak frequency of said plasma-wave resonance signal picked up for determining the strength of said magnetic field.

References Cited

UNITED STATES PATENTS 2,589,494   3/1952   Hershberger _____ 324—.5

OTHER REFERENCES

Physical Review Letters (Bowers et al.), vol. 7, No. 9, Nov. 1, 1961, pp. 339–341.

Physical Review (Taylor et al.), vol. 129, No. 6, Mar. 15, 1963, pp. 2525–2529.

Scientific American (Bowers), vol. 209, No. 5, November 1963, pp. 46–53.

RUDOLPH V. ROLINEC, *Primary Examiner.*

M. J. LYNCH, *Assistant Examiner.*